(12) United States Patent
Nagamoto et al.

(10) Patent No.: US 7,192,073 B2
(45) Date of Patent: Mar. 20, 2007

(54) UNDERFLOOR STORAGE STRUCTURE FOR VEHICLE

(75) Inventors: Satoru Nagamoto, Wako (JP); Ryosuke Matsuoka, Wako (JP); Kiyoshi Yajima, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 137 days.

(21) Appl. No.: 10/524,794

(22) PCT Filed: May 19, 2003

(86) PCT No.: PCT/JP03/06226

§ 371 (c)(1),
(2), (4) Date: Feb. 15, 2005

(87) PCT Pub. No.: WO2004/020248

PCT Pub. Date: Mar. 11, 2004

(65) Prior Publication Data

US 2005/0236860 A1    Oct. 27, 2005

(30) Foreign Application Priority Data

Aug. 27, 2002  (JP)  ............................ 2002-247405
Jan. 27, 2003  (JP)  ............................ 2003-017677

(51) Int. Cl.
    *B60R 7/04*    (2006.01)
(52) U.S. Cl. .................. 296/37.14; 296/37.2; 296/37.8; 296/37.15; 296/37.16

(58) Field of Classification Search ............... 296/37.2, 296/37.14, 37.15, 37.3, 66, 37.16, 37.8; 224/297
See application file for complete search history.

(56) References Cited

U.S. PATENT DOCUMENTS

| 2,568,628 A | * | 9/1951 | Herring ...................... 224/553 |
| 5,195,795 A | | 3/1993 | Cannera et al. |
| 6,145,907 A | | 11/2000 | Maruyama et al. |
| 6,338,518 B1 | | 1/2002 | D'Annunzio et al. |

FOREIGN PATENT DOCUMENTS

| DE | 44 09 562 C1 | 4/1995 |
| FR | 2 710 297 | 3/1995 |
| JP | 6-179381 | 6/1994 |
| JP | 3011086 | 3/1995 |
| JP | 11-105746 | 4/1999 |
| JP | 2000-142247 | 5/2000 |

* cited by examiner

*Primary Examiner*—Lori L. Coletta
(74) *Attorney, Agent, or Firm*—Hamre, Schumann, Mueller & Larson, PC

(57) ABSTRACT

An underfloor storage structure for a vehicle comprises a floor panel (5) which includes a concave portion as a storage space (6), and which partially covers a port (7) of the storage space, a rotatable tray (36) disposed in the storage space (6), and at least one lid (8) for selectively closing the remaining portion of the port (7) of the storage space (6). A passenger seated in one of seats (2, 3) of the vehicle can freely and easily access pieces of luggage stored in the storage space (6) by rotating the rotatable tray (36).

7 Claims, 17 Drawing Sheets

UNDERFLOOR STORAGE STRUCTURE FOR VEHICLE

BACKGROUND OF THE INVENTION

1. Field of the Invention

The present invention relates to an underfloor storage structure for a vehicle, and in particular, the present invention relates to an underfloor storage structure for a vehicle, which is provided therein with a rotatable tray.

2. Description of the Related Art

As disclosed, for example, in Japanese Unexamined Patent Application, First Publication No. Hei 11-105746, an underfloor storage structure is known in which a storage space for a spare tire is formed in a floor panel between front seats and rear seats, and a port of the storage space is opened or closed by a lid provided on the floor panel. The front portion of the storage space is covered by the floor panel in order to arrange the front seats above the storage space, and the rear portion of the storage space can be opened or closed by the lid.

According to such an underfloor storage structure, because the lid for opening or closing the port of the storage space is disposed between the front seats and the rear seats, an advantage is obtained in that access to the inside of the storage space may be made without tilting the seats.

When the above-mentioned underfloor storage space is employed for goods such as a spare tire, which are relatively large, and which are not frequently used, any problems are encountered; however, when the underfloor storage space is employed for small goods such as other than a spare tire, a problem is encountered in that it is difficult to take out the small goods stored in the back of the storage space, which is covered by the floor panel. More specifically, when small goods are stored in a large space, which is large so as to accommodate a spare tire, the small goods must be found in the large space before being accessed to and being taken out, which is time-consuming.

SUMMARY OF THE INVENTION

In consideration of the above circumstances, an object of the present invention is to provide an underfloor storage structure for a vehicle, which enables a person to easily and smoothly take out small goods, in which a number of small goods may be stored, the small goods may be taken out from various directions, and stored goods will not move around when the vehicle travels, and which has sufficient rigidity and strength so that structural elements thereof will not be broken even when heavy goods are stored therein.

In order to achieve the above object, the present invention provides an underfloor storage structure for a vehicle comprising: a floor panel which includes a concave portion as a storage space, and which partially covers a port of the storage space; a rotatable tray disposed in the storage space; and at least one lid for selectively closing the remaining portion of the port of the storage space.

According to the above underfloor storage structure of the present invention, because one of the separate storage sections disposed at the distal position may be moved to the proximal position by opening the lid and by rotating the rotatable tray, a piece of luggage stored in a portion of the storage space that is covered by the floor panel may be taken out after being moved to the proximal position. On the other hand, a piece of luggage placed in one of the separate storage sections that is disposed at the proximal position may be moved to the distal position for storing by rotating the rotatable tray, and thus many pieces of luggage may be stored therein.

The vehicle may comprise first row seats having two separate seats and second row seats located behind the first row seats. The storage space may extend from a position under the first row seats to a position in front of the second row seats. The underfloor storage structure may comprise a first lid whose rear edge is made liftable for selectively closing the port of the storage space, and a second lid which is provided in the first lid, and whose front edge is made liftable. The second lid may be located between the separate first row seats.

According to the above underfloor storage structure, the passengers can freely and easily access pieces of luggage stored in the storage space. More specifically, a passenger seated in the first row seat can take out a piece of luggage by opening the second lid even when passengers seated in the second seat put their legs on the first lid, and a passenger seated in the second row seat can take out a piece of luggage by opening the first lid. In addition, a piece of luggage stored in a portion of the storage space under the first seats may be taken out after rotating the rotatable tray.

In the above underfloor storage structure, the rotatable tray may comprise partition walls therein, and a locking mechanism may be provided for the rotatable tray, which locks the rotation of the rotatable tray upon closing the first or second lid.

According to the above underfloor storage structure, a plurality of separate storage sections can be ensured in the rotatable tray by dividing the inside of the rotatable tray. Moreover, when a force, which could produce rotation of the rotatable tray, is applied to the partition walls, the rotation of the rotatable tray is restrained by the locking mechanism in a state in which the first lid and second lids are closed. In addition, the pieces of luggage in the storage space will not be broken due to excessive circumferential movement thereof.

In the above underfloor storage structure, the locking mechanism may be configured such that the locking of the rotatable tray is cancelled when a rotational load greater than a predetermined value due to luggage stored in the rotatable tray is applied to the rotatable tray.

According to the above underfloor storage structure, because the locking state of the locking mechanism is temporarily cancelled when an excessive rotational force is applied to the partition walls due to the stored luggage, the rotatable tray and the locking mechanism are prevented from being broken.

In the above underfloor storage structure, at least one of the first and second lids may comprise a metal frame and a resin plate.

According to the above underfloor storage structure, the rigidities and strengths of the first and second lids can be sufficiently ensured when the first and second lids are closed so as to be flat with the floor panel.

In the above underfloor storage structure, on the bottom of the storage space, there may be provided a support base for rotatably supporting the rotatable tray, and the support base may comprise a support element made of metal, a backing plate made of metal, and a resin tray body sandwiched between the support element and the backing plate.

According to the above underfloor storage structure, the supporting rigidity of the rotatable tray can be sufficiently ensured.

In the above underfloor storage structure, a separating wall is provided between the floor panel under the first row seats and the rotatable tray.

According to the above underfloor storage structure, a piece of luggage will not be engaged between the rotatable tray and the floor panel, and as a result, the rotation of the rotatable tray will not be inhibited.

DESCRIPTION OF THE PREFERRED EMBODIMENTS

An embodiment of the present invention will be explained below with reference to the appended drawings.

Figure 1:
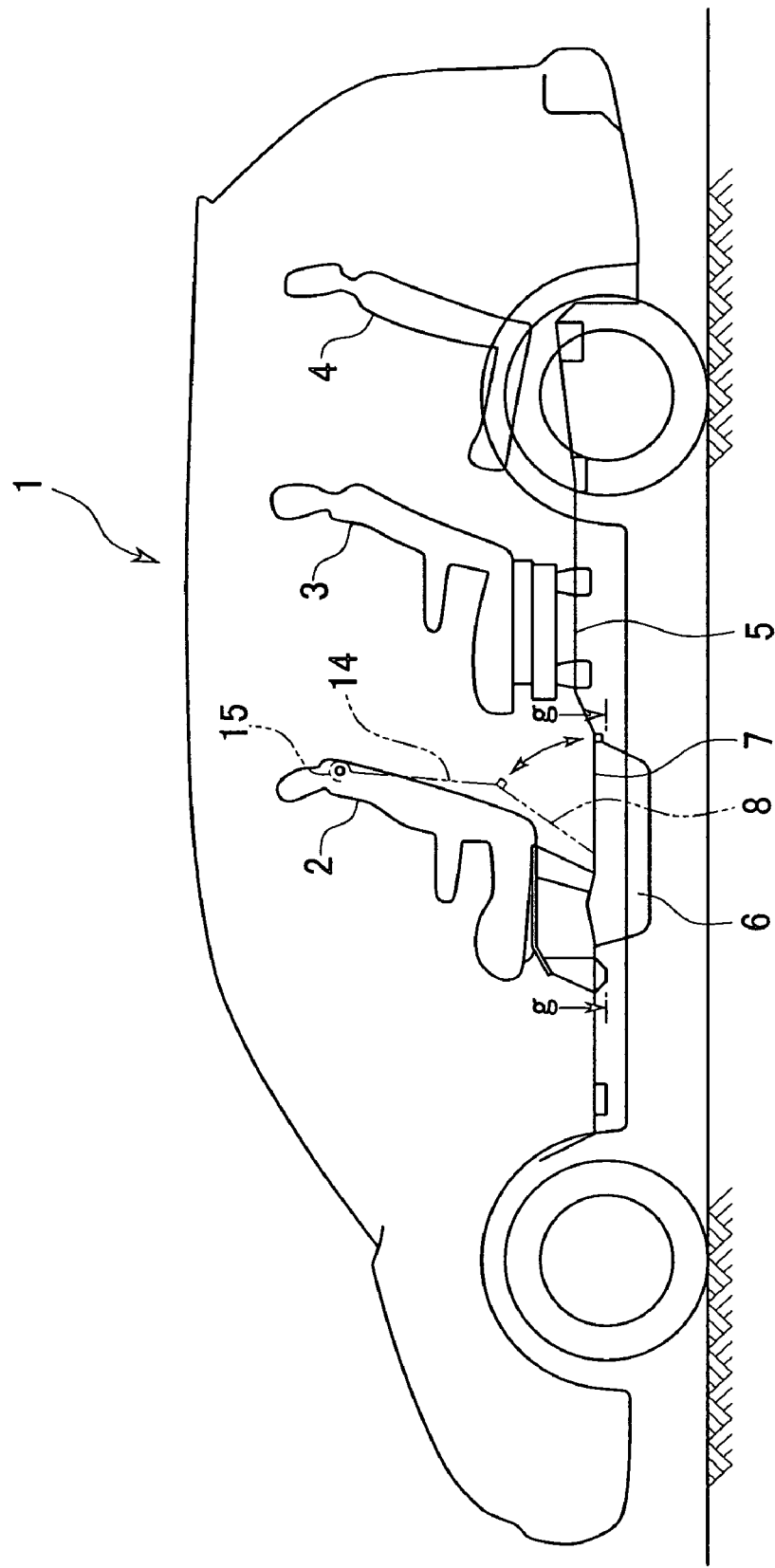
FIG. 1 is a perspective side view showing a vehicle of an embodiment of the present invention.

FIG. 1 shows a two-box style vehicle 1 to which an underfloor storage structure for a vehicle in an embodiment of the present invention is applied, and which comprises three rows of seats disposed one behind another.

The vehicle 1 has a seat arrangement in which first row seats 2, second row seats 3, and a third row seats 4 are arranged one behind another on a floor from the foreside to the backside of the vehicle 1, and each of the rows comprises two seats that are disposed laterally and separately.

The floor panel 5 is expanded downward at a portion thereof under the first row seats 2, and thus a storage space 6 is formed. To an upper port 7 of the storage space 6, a first lid 8, which opens or closes rear portion of the upper port 7, is provided so that passengers seated in the second row seats 3 can take out goods stored in the storage space 6.

Figure 2:
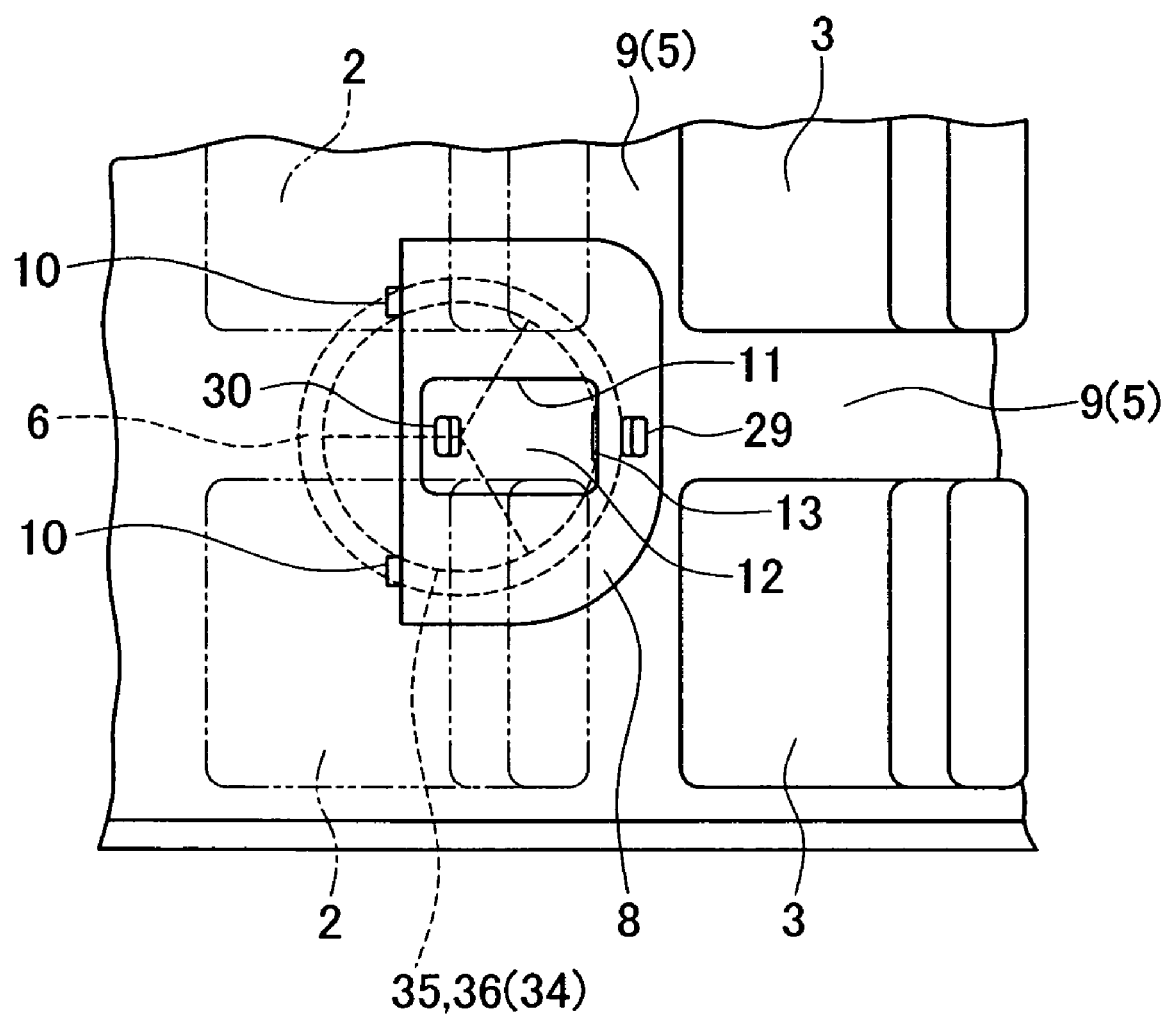
FIG. 2 is a plan view showing a floor of the vehicle of the present invention.
Figure 3:
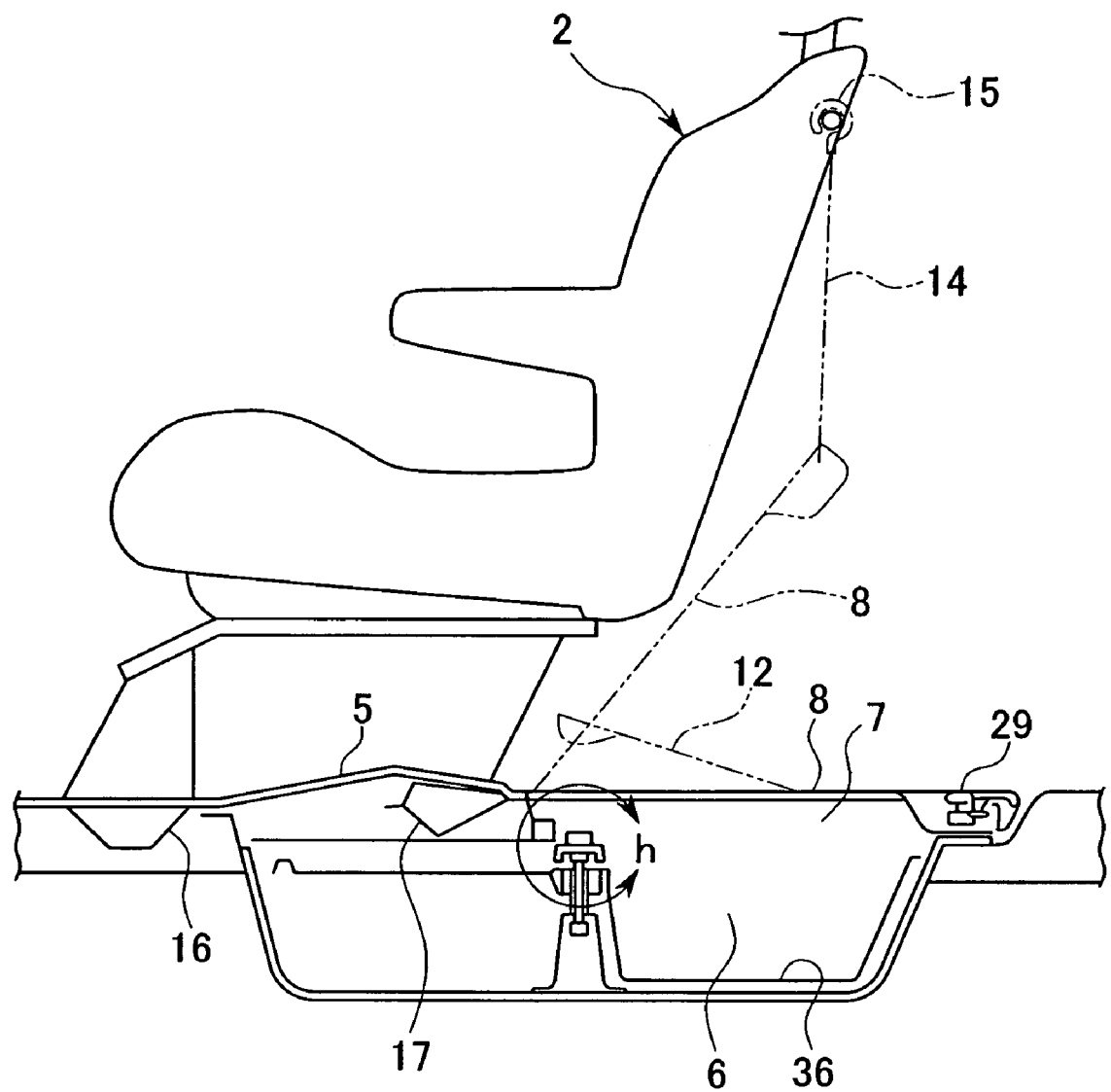
FIG. 3 is an enlarged view showing a major portion in FIG. 1.

As shown in FIGS. 2 and 3, the spaces between two seats of seats 2, 3, and 4 are uses as aisles 9 through which passengers can walk laterally and longitudinally. The first lid 8 is disposed between the first row seats 2, and front edge thereof is connected to the floor panel 5 using hinge brackets 10 in a pivotable manner.

The front edge of the first lid 8 is formed in a straight shape so as to extend in the lateral direction of the vehicle 1. The rear edge of the first lid 8 is positioned at a place slightly forward from the front end of the seat cushions of the second row seats 3, and both sides of the rear edge are formed in a rounded shape so as to prevent interference with the legs of passengers seated in the second row seats 3 during an opening or closing operation of the first lid 8.

In the first lid 8, an opening 11 is formed at a portion thereof between the first row seats 2, in which a second lid 12 is provided that is connected to the first lid 8 using a hinge bracket 13 in a pivotable manner so as to make the front edge of the second lid 12 liftable, and so that passengers seated in the first row seats 2 can take out goods stored in the storage space 6.

In addition, as shown in FIGS. 1 and 3, an end of a wire 14 is connected to the underside of the first lid 8, and the other end of the wire 14 is provided with a hook 15 which is, on one hand, engageable with the underside of the first lid 8 (such a configuration of the first lid 8 is not shown), and which is, on the other hand, engageable with the seatback of the first row seat 2 so that the first lid 8 is supported by the seatback of the first row seat 2 when the first lid 8 is in an open state.

As shown in FIG. 3, under two portions of the floor panel 5 corresponding to the front end and rear end of the first row seats 2, there are provided a front cross member 16 and rear cross member 17, respectively, each of which extends in the lateral direction of the vehicle 1. The storage space 6 is formed across the rear cross member 17, and the front edge of the first lid 8 is disposed behind the rear cross member 17. Accordingly, the front portion of the storage space 6 is covered by the floor panel 5 under which the cross member 17 is provided, and the rear portion of the storage space 6 is selectively opened or closed by the first lid 8.

Figure 4:
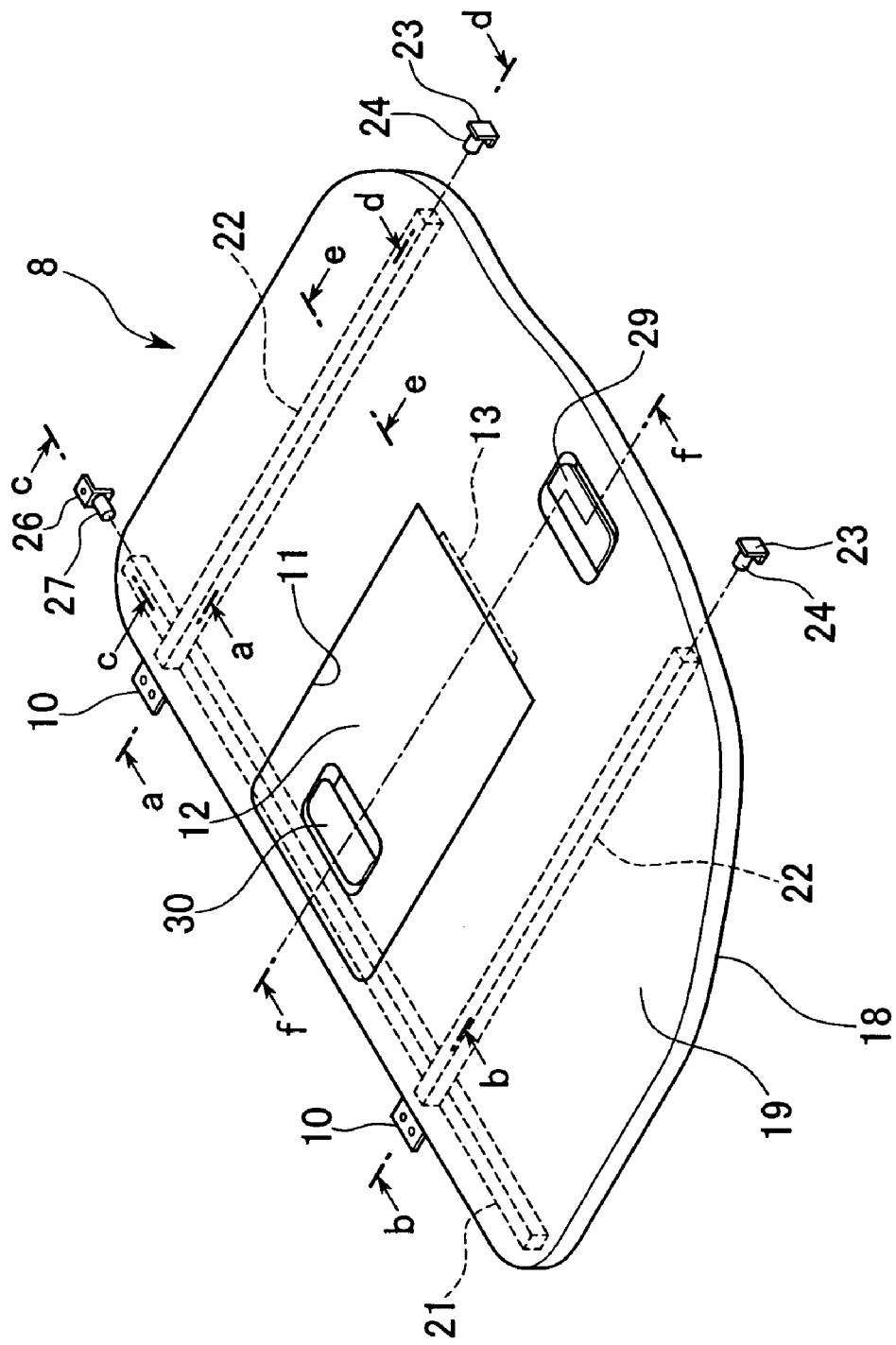
FIG. 4 is a perspective view showing a first lid in the embodiment of the present invention.

As shown in FIGS. 4 to 9, the first lid 8, which has a multi-resin-plate structure, comprises a resin base 18, a resin mat 19 provided on the resin base 18, and metal frames 21 and 22, which will be explained below, provided inside a closed-sectional hollow body 20 made of resin (not shown in FIG. 4).

Figure 10:
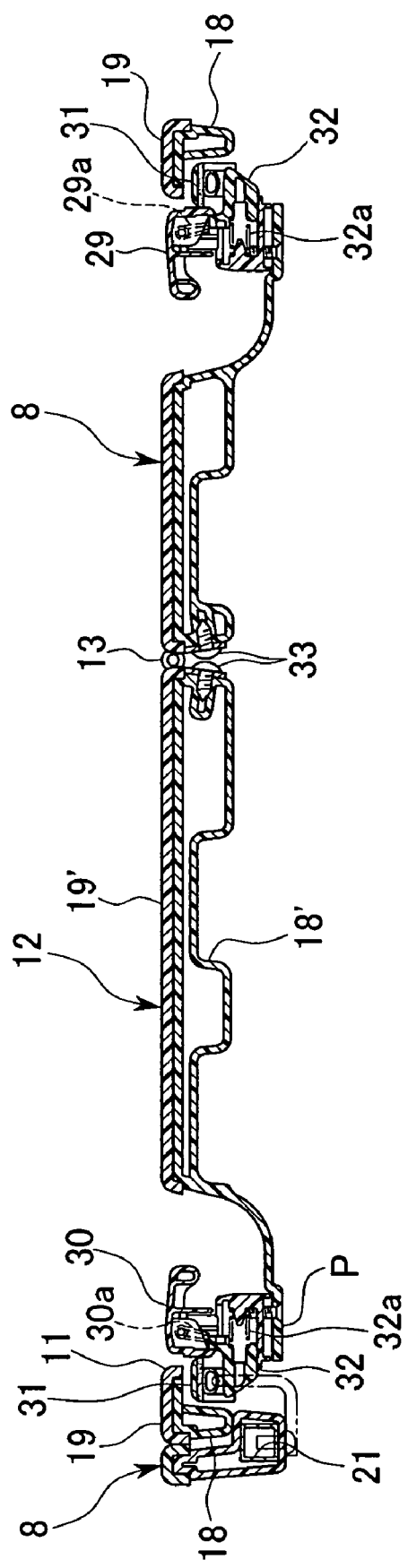
FIG. 10 is a cross-sectional view taken along the line f—f in FIG. 4.

As shown in FIG. 10, the second lid 12, which has a multi-resin-plate structure, comprises a resin base 18' and a resin mat 19' provided on the resin base 18'. The resin base 18' is provided with a closed-sectional hollow body (not shown) on the underside peripheral portion thereof, which is formed so as to be supported by another closed-sectional hollow body (not shown) provided along the inside perimeter of the opening 11 in the first lid 8.

Because the first and second lids 8 and 12 are provided in the floor panel 5, the first and second lids 8 and 12 are formed so as to have rigidity and strength sufficient to support the weight of a passenger walking through the aisles 9.

More specifically, with reference to FIG. 4, a first metal frame 21 having a hollow rectangular cross-section is provided in the first lid 8 along the lateral direction thereof, and two second metal frames 22, each of which has a hollow rectangular cross-section, are provided in the first lid 8 along the longitudinal direction thereof and substantially in parallel to the side edges of the second lid 12.

Figure 8:
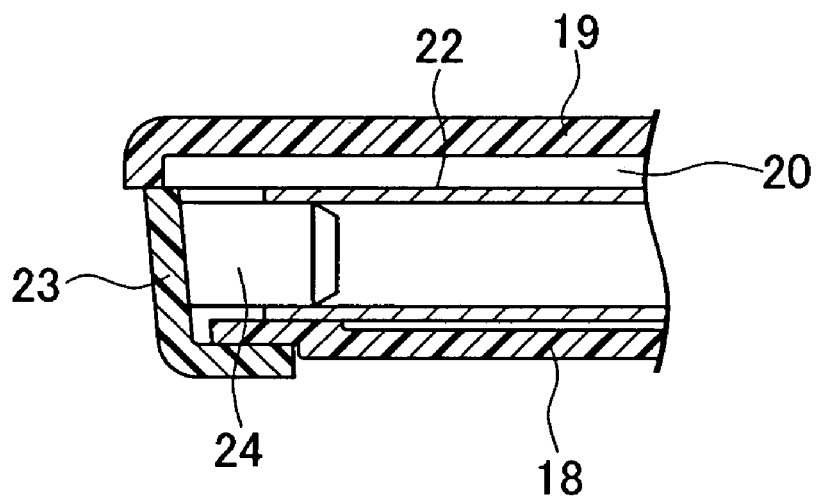
FIG. 8 is a cross-sectional view taken along the line d—d in FIG. 4.
Figure 9:
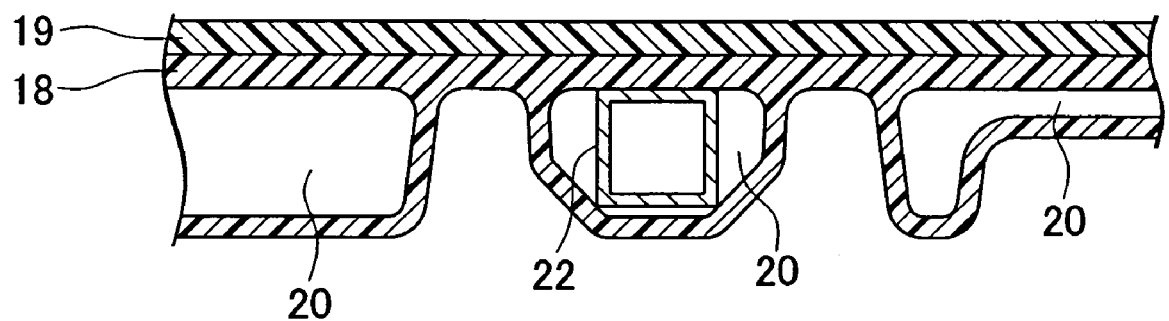
FIG. 9 is a cross-sectional view taken along the line e—e in FIG. 4.

As shown in FIGS. 8 and 9, each of the second metal frames 22 is disposed in the closed-sectional hollow body 20 that is formed on the underside of the resin base 18 disposed under the resin mat 19 so as to extend in the longitudinal direction and substantially in parallel to the side edge of the second lid 12. Each of the second metal frames 22 is inserted into a boss 23 of a support bracket 23, which is fixed to the resin base 18 using a screw (not shown), so as to be fixed to the resin base 18.

Figure 5:
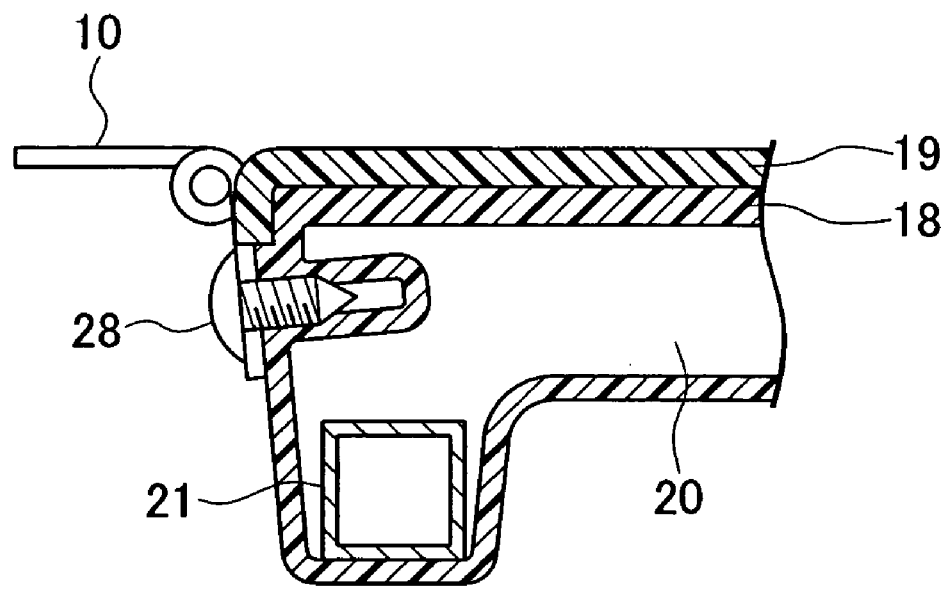
FIG. 5 is a cross-sectional view taken along the line a—a in FIG. 4.
Figure 6:
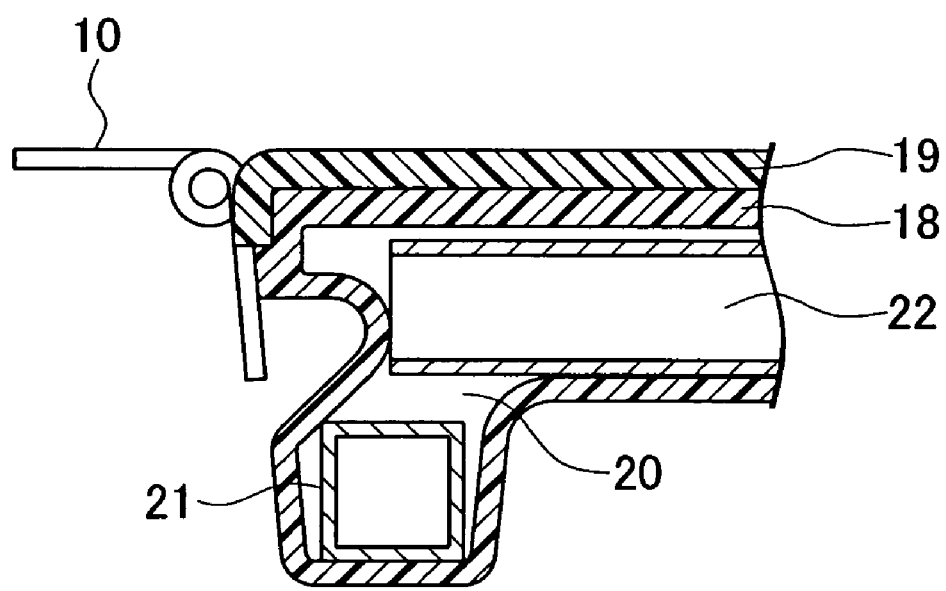
FIG. 6 is a cross-sectional view taken along the line b—b in FIG. 4.
Figure 7:
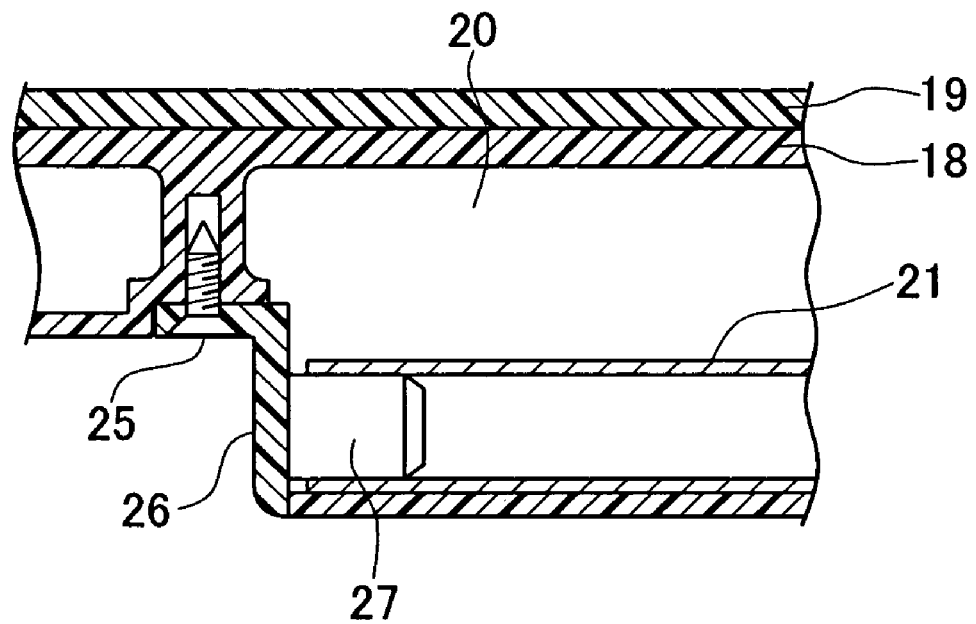
FIG. 7 is a cross-sectional view taken along the line c—c in FIG. 4.

As shown in FIGS. 5 to 7, the closed-sectional hollow body 20 is formed on the underside of the resin base 18 and at the front edge thereof so as to extend in the lateral direction. The first metal frame 21 is disposed in the closed-sectional hollow body 20 and under the second metal frame 22. As shown in FIG. 7, the first metal frame 21 is, as in the case of the second metal frames 22, inserted into a boss 27 of a support bracket 26, which is fixed to the resin base 18 at the right end of the resin base 18 using a screw 25, so as to be fixed to the resin base 18. As shown in FIGS. 5 and 6, the hinge bracket 10 is fixed to the end face of the resin base 18 at the front end of the first lid 8 using a screw 28. Metal frames may also be provided to the second lid 12.

As shown in FIG. 10, a first handle portion 29 is provided at the rear end of the first lid 8 in a pivotable manner, and a second handle portion 30, which has a structure similar to that of the handle portion 29, is provided at the liftable end of the second lid 12. The levels of the first and second handle portions 29 and 30 are set to be lower than the surface of the floor panel 5 so as not to interfere with the flatness of the floor panel 5. The first and second handle portions 29 and 30 are configured to be returnable by springs 29a and 30a, respectively.

The first handle portion 29 is provided for engaging a lock portion 32 with a striker 31 provided to the floor panel 5, and the second handle portion 30 is provided for engaging a lock portion 32 with a striker 31 provided to the opening 11 of the first lid 8. The hinge bracket 13 is disposed between the second lid 12 and the opening 11 of the first lid 8, while an end thereof is fixed to the base of the second lid 12 using a screw 33, and the other end thereof is fixed to the base of the first lid 8 using another screw 33.

Accordingly, when the first handle portion 29 is pivoted while overcoming the restoring force of the spring 29a, the lock portion 32 pressed against the first handle portion 29 is moved while overcoming the restoring force of a spring 32a so that the lock portion 32 is disengaged from the corresponding striker 31, and as a result, the first lid 8 can be opened by lifting up the first handle portion 29. On the other hand, when the second handle portion 30 is pivoted while overcoming the restoring force of the spring 30a, the lock portion 32 pressed against the second handle portion 30 is moved while overcoming the restoring force of a spring 32a so that the lock portion 32 is disengaged from the corresponding striker 31, and as a result, the second lid 12 can be opened by lifting up the second handle portion 29. FIGS. 5 and 6 show cross-sections around the hinge bracket 13, and more specifically, FIG. 5 shows a cross-section taken along the screw 28 of the hinge bracket 10, and FIG. 6 shows a cross-section taken along the second metal frame 22.

In the storage space 6 formed under the first lid 8 in a manner as described above, there is provided a tray unit 34.

The tray unit 34 comprises a tray body 35 which is made of resin, and which is formed in a shape corresponding to that of the floor panel 5 being concave downward, and a rotatable tray 36 which is made of resin, and which is made rotatable in such a manner that the surface thereof moves along the concave surface of the floor panel 5.

The tray body 35 comprises a flat bottom wall (bottom portion) 35a, and a peripheral wall 35b extending from the periphery of the bottom wall 35a in an inclined manner (as viewed in a cross-section). There are provided insulation materials 37 between the bottom wall 35a and the floor panel 5, and between the peripheral wall 35b and the floor panel 5 that forms the storage space 6.

At the center of the bottom wall 35a, which is substantially the bottom portion of the storage space 6, of the tray body 35, there is provided a support base 38 for rotatably supporting the rotatable tray 36. The support base 38 comprises a support element 39 made of metal, a backing plate 40 made of metal, and a portion of the tray body 35 made of resin (more specifically, a portion of the bottom wall 35a) sandwiched between the support element 39 and the backing plate 40.

The support element 39 is a cup-shaped element made by press-forming a metal plate, and the support element 39 is attached to the bottom wall 35a of the tray body 35 in such a manner that an opening of the support element 39 is directed downward. A flange 41 is formed around the opening of the support element 39, and the backing plate 40 made of metal is provided on the underside of the bottom wall 35a of the tray body 35 so as to positionally correspond to the flange 41. The backing plate 40 is connected to the flange 41 using rivets 42 so as to act as reinforcement. More specifically, the bottom wall 35a of the tray body 35 is sandwiched between the flange 41 of the support element 39 and the backing plate 40, whereby supporting rigidity of the support element 39 is increased.

A pipe-shaped shaft 43 is welded to an upper wall 39a of the support element 39. The rotatable tray 36 is rotatably supported by means of a bearing 44 provided to the shaft 43.

Figure 13:
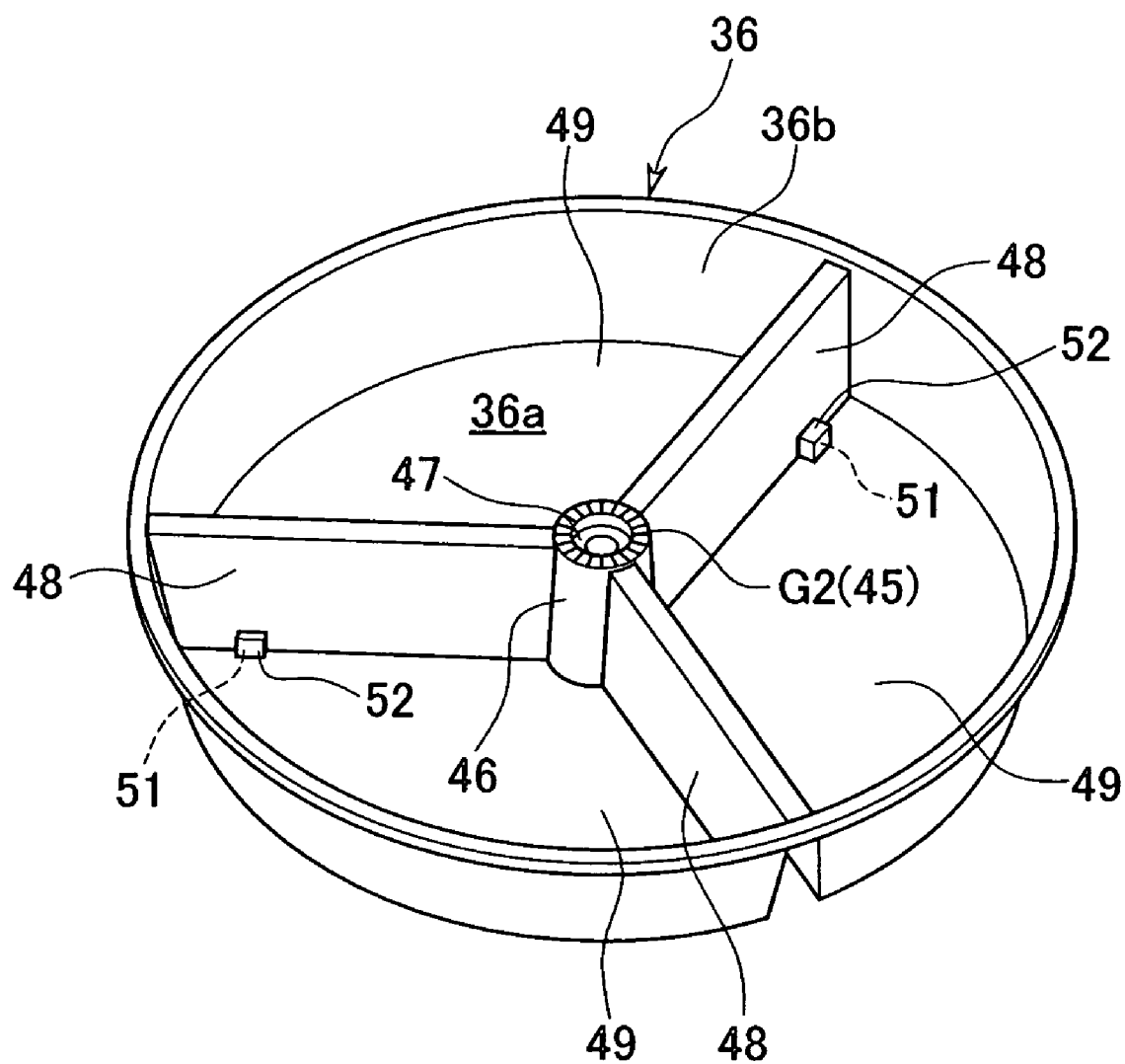
FIG. 13 is a perspective view showing a rotatable tray in the embodiment of the present invention.

As shown in FIG. 13, the rotatable tray 36 in this embodiment comprises the bottom wall 36a having a circular shape corresponding to the tray body 35, and the peripheral wall 36b. The rotatable tray 36 further comprises, at the center thereof, a mounting portion 46 which includes a shoulder portion 45, and which is raised from the bottom wall 36a so as to clear the support element 39 and the shaft 43. An attachment portion 47 having a concave shape is formed inside the shoulder portion 45 of the mounting portion 46 for installation of the bearing 44. The rotatable tray 36 further comprises three partition walls 48 which extend from the mounting portion 46 to the peripheral wall 36b are provided at every 120 degrees so as to form three separate storage sections 49 in the rotatable tray 36. The number of separate storage sections may be three or more. Since the rotatable tray 36 is configured in such a manner, pieces of luggage may be stored in the separate storage sections 49 in an orderly manner. Each of the separate storage sections 49 is formed such that most portion thereof is exposed when the second lid 12 is opened (see FIG. 2).

Each of the partition walls 48 is formed as a hollow rib extending from the bottom wall 36a so as to have sufficient rigidity. In order to further increase rigidity of the partition wall 48, ribs 50 are formed in the partition wall 48, which downwardly extends from the top wall of the partition wall 48 as shown in FIG. 11.

Figure 11:
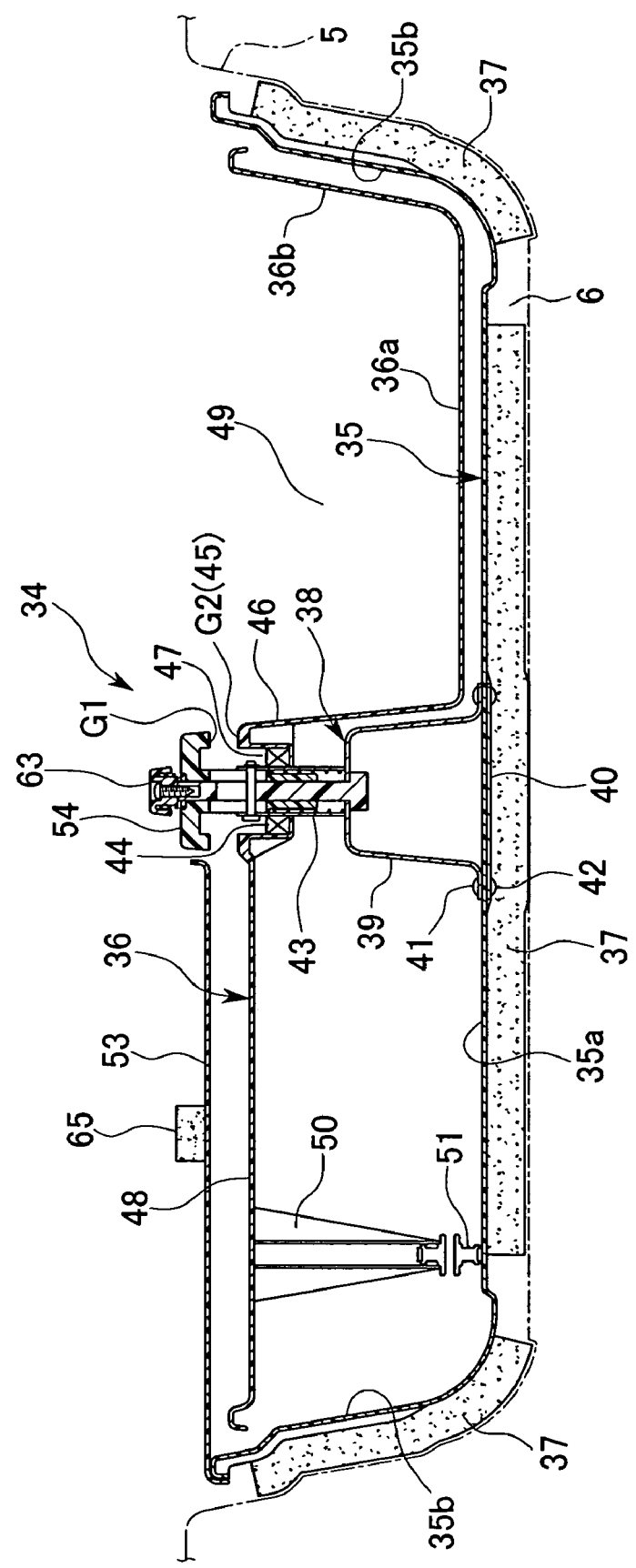
FIG. 11 is a cross-sectional view taken along the line g—g in FIG. 1.

Moreover, as shown in FIG. 11, each of the partition walls 48 is provided with a wheel 51 at the bottom thereof, which rolls along a circumferential direction of the tray body 35 while contacting the bottom wall 35a of the tray body 35, and with which the rotatable tray 36 rotatable about the support element 39 of the tray body 35 is supported by the tray body 35. A relief portion 52 is formed on the partition wall 48 in the vicinity of the wheel 51 in order to prevent interference between the partition wall 48 and the wheel 51.

Figure 12:
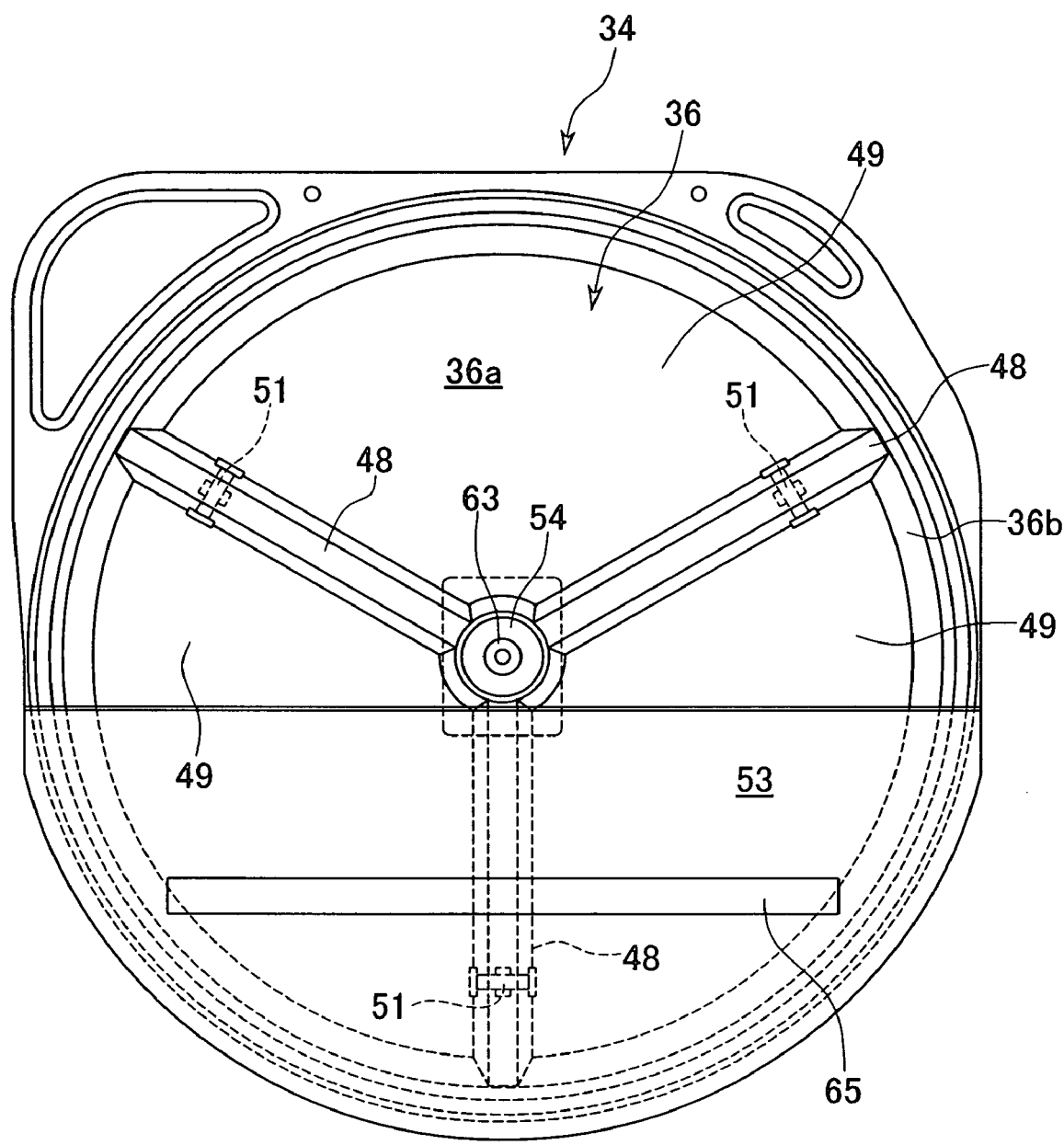
FIG. 12 is a plan view showing a tray unit in the embodiment of the present invention.

As shown in FIGS. 11 and 12, a separating wall 53 is attached to a front half of the upper periphery of the tray body 35 so as to cover a forward portion of the rotatable tray 36 with respect to the mounting portion 46, and so as to separate floor panel 5 disposed under the first row seats 2 from the rotatable tray 36, whereby a piece of luggage is prevented from interfering with the floor panel 5, and as a result, the rotatable tray 36 may be smoothly rotated, and pieces of luggage may be smoothly handled.

On the upper face of the separating wall 53, there is provided a cushion 65 extending in the lateral direction of the vehicle 1 in order to prevent noise due to interference of the separating wall 53 with the cross member 17 disposed under the floor panel 5.

Figure 14:
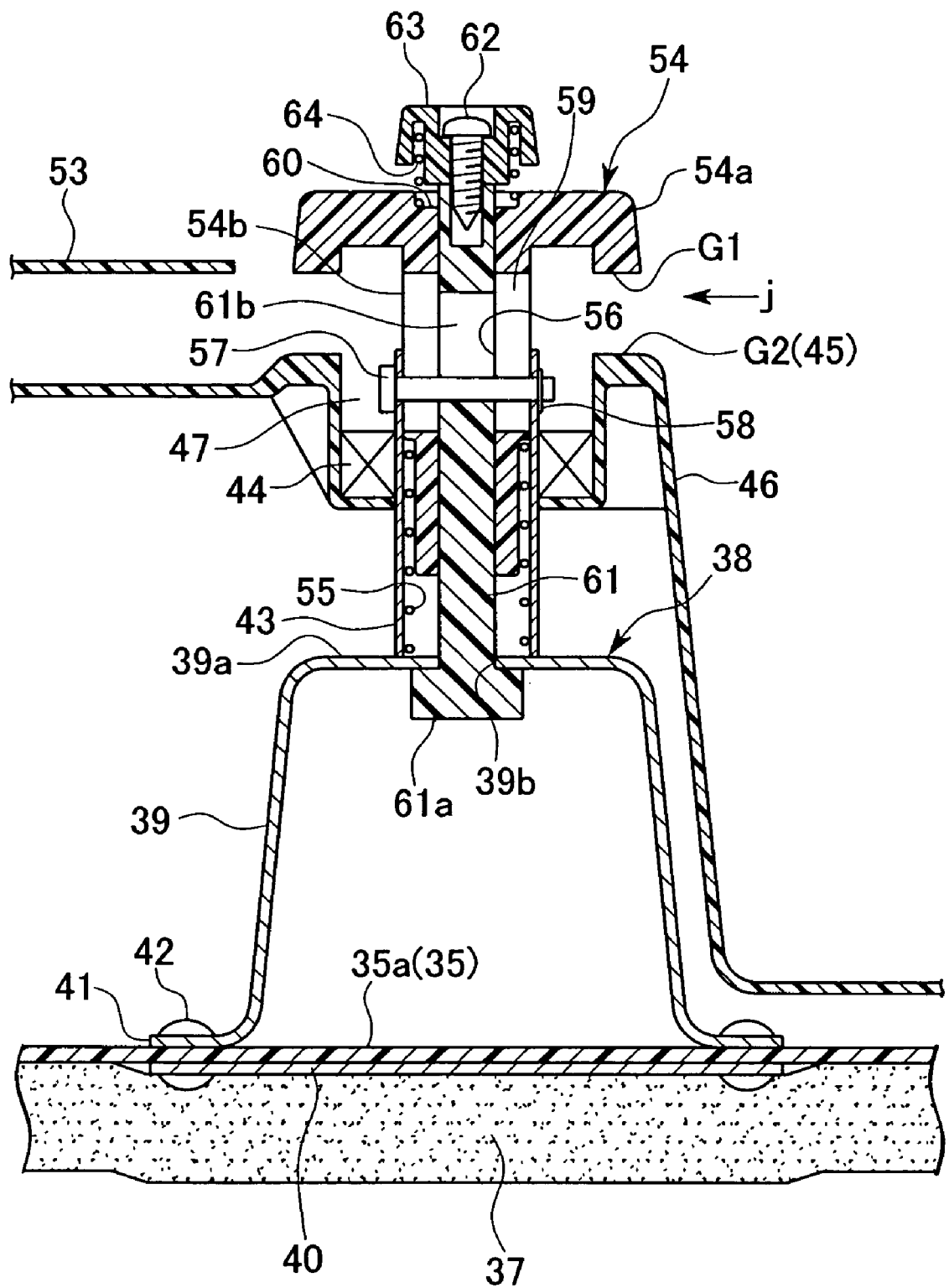
FIG. 14 is an enlarged cross-sectional view showing the portion "h" in FIG. 1.
Figure 15:
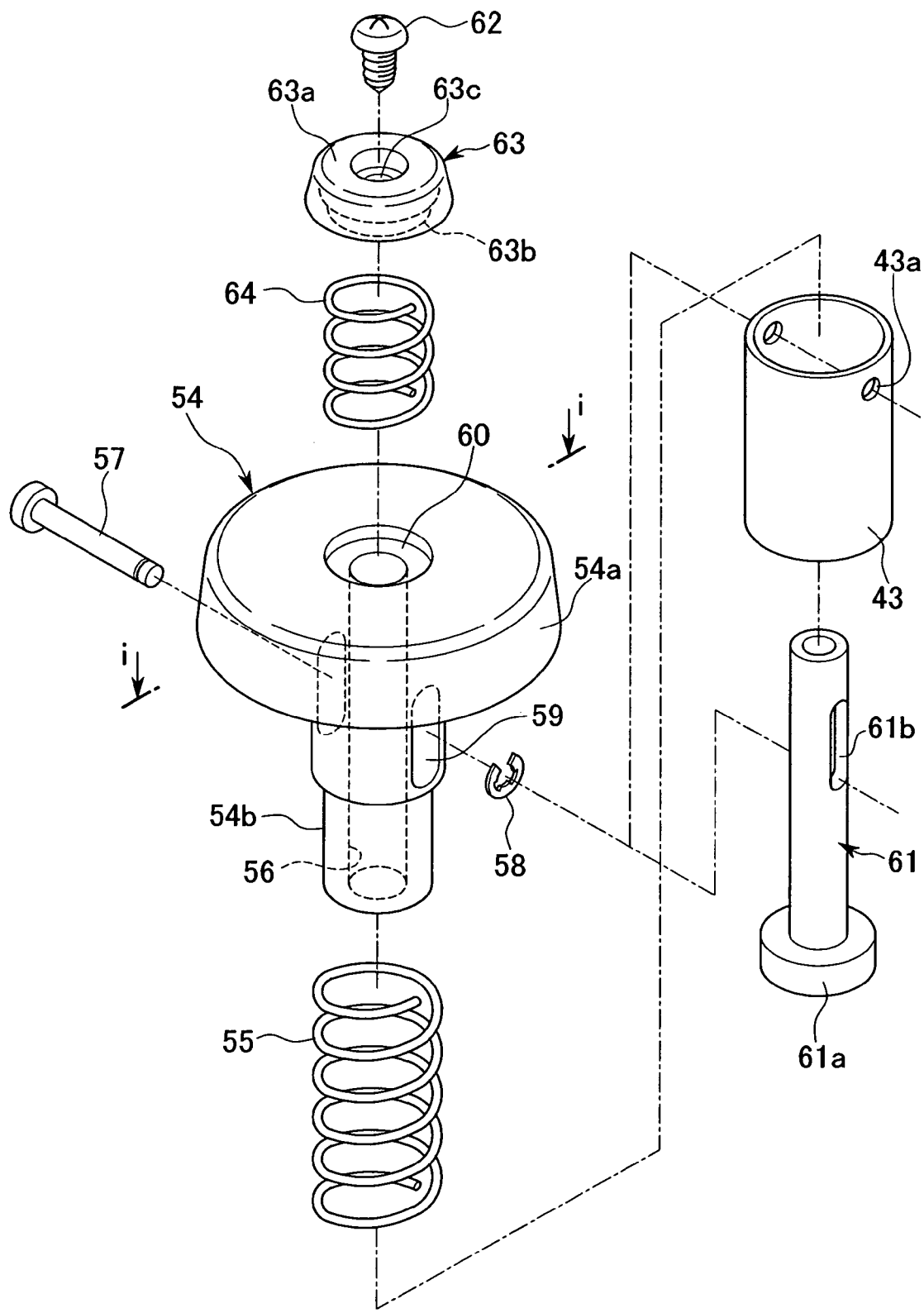
FIG. 15 is an exploded perspective view showing a locking unit.
Figure 16:
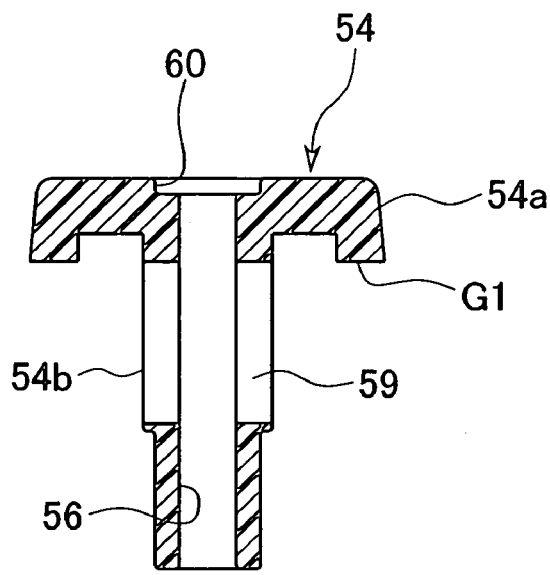
FIG. 16 is a cross-sectional view taken along the line i—i in FIG. 15.

Furthermore, as shown in FIGS. 14 to 16, a locking element 54 (part of a locking mechanism) is provided in such a manner that a portion of the locking element 54 is inserted into the hollow shaft 43, and the locking element 54 is made movable vertically while being biased upward by a spring 55 (part of a locking mechanism).

Through holes 43a are formed in an upper portion of the shaft 43 so as to penetrate the shaft 43 in the diametrical direction thereof. A locking pin 57 is inserted into the through holes 43a, and is fixed thereto using an E-ring 58.

Figure 17:
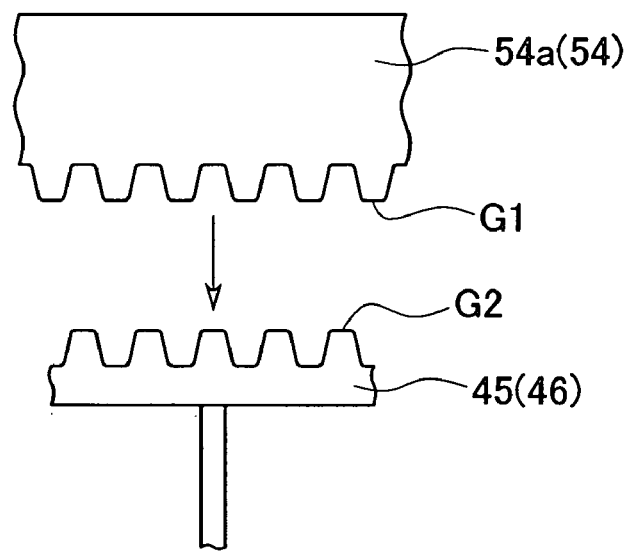
FIG. 17 is a side view as viewed from the arrow "j" in FIG. 14.
Figure 18:
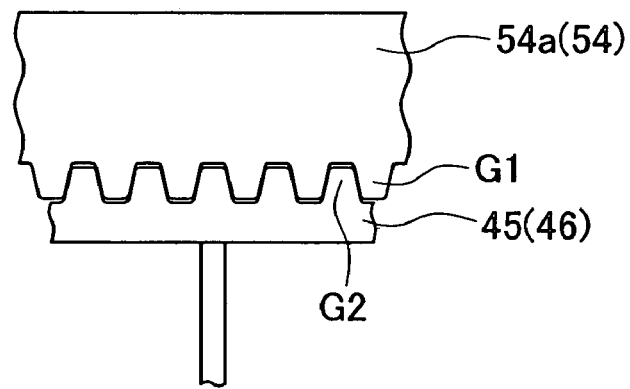
FIG. 18 is a side view as viewed from the arrow "k" in FIG. 19.

As shown in FIG. 15, the locking element 54 comprises a flange portion 54a, a shaft portion 54b, and a through hole 56 formed in the center of the shaft portion 54b. Moreover, as shown in FIGS. 17 and 18, there are formed engagement teeth G1 (part of a locking mechanism) each having a gear tooth shape on the underside and the periphery of the locking element 54. The engagement teeth G1 are made engageable with corresponding engagement teeth G2 (part of a locking mechanism) which are formed on the upper surface of the shoulder portion 45 of the mounting portion 46 of the rotatable tray 36. Accordingly, the rotation of the rotatable tray 36 can be locked at every possible engaging state between the engagement teeth G1 and the engagement teeth G2. Note that the gear tooth shape defining the engagement teeth G1 and G2 may be a trapezoidal shape as shown in FIGS. 17 and 18, or alternatively, the shape may be a curved shape such as a sinusoidal shape, and the shape may be preferably determined such that rotation of the rotatable tray 36 in an engaging state produces an axial movement of the locking element 54 as will be explained below.

In addition, elongated through holes 59 elongated in the vertical direction are formed in the shaft portion 54b so as to penetrate the shaft portion 54b in the diametrical direction thereof. The locking pin 57 fixed to the shaft 43 is disposed through the elongated through holes 59 so that vertical movement of the locking element 54 is restrained, and coming off of the locking element 54 is prevented.

The diameter of a lower portion of the shaft portion 54b as viewed from the elongated through holes 59 is made smaller than that of a portion where the elongated through holes 59 are formed so that the spring 55 is mounted thereto.

Furthermore, a step portion 60 is formed around an opening of the through hole 56 of the flange portion 54a.

Moreover, a hole 39b, which has the same inner diameter as that of the through hole 56 of the locking element 54, is formed in the upper wall 39a of the support element 39 and in the center of the attachment region for the shaft 43, and a push rod 61 (a part of a locking mechanism) is disposed through the hole 39b and the through hole 56 of the locking element 54 so be movable in the vertical direction. The push rod 61 comprises an enlarged diameter portion 61a disposed at the bottom thereof, and an elongated through hole 61b formed in the middle thereof through which the locking pin 57 is disposed. The push rod 61 is provided, at the top thereof, with a push knob 63 (a part of a locking mechanism) fixed thereto using a screw 62.

As shown in FIG. 15, the push knob 63 comprises a head portion 63a and a shaft portion 63b. A push spring 64 (a part of a locking mechanism) is disposed between the underside of the head portion 63a and the step portion 60 formed in the flange portion 54a of the locking element 54 so as to press the locking element 54 downward. An insertion hole 63c for the screw 62 is formed in the center of the shaft portion 63b so as to allow the screw 62 to be fixed to the upper end of the push rod 61. Between the bottom end of the shaft portion 63b and the bottom of the step portion 60 of the locking element 54, there is provided a clearance L (see FIG. 19) sufficient to cancel the engagement between the engagement teeth G1 of the locking element 54 and the engagement teeth G2 on the shoulder portion 45 of the rotatable tray 36 when the first lid 8 is in a closed state.

Figure 19:
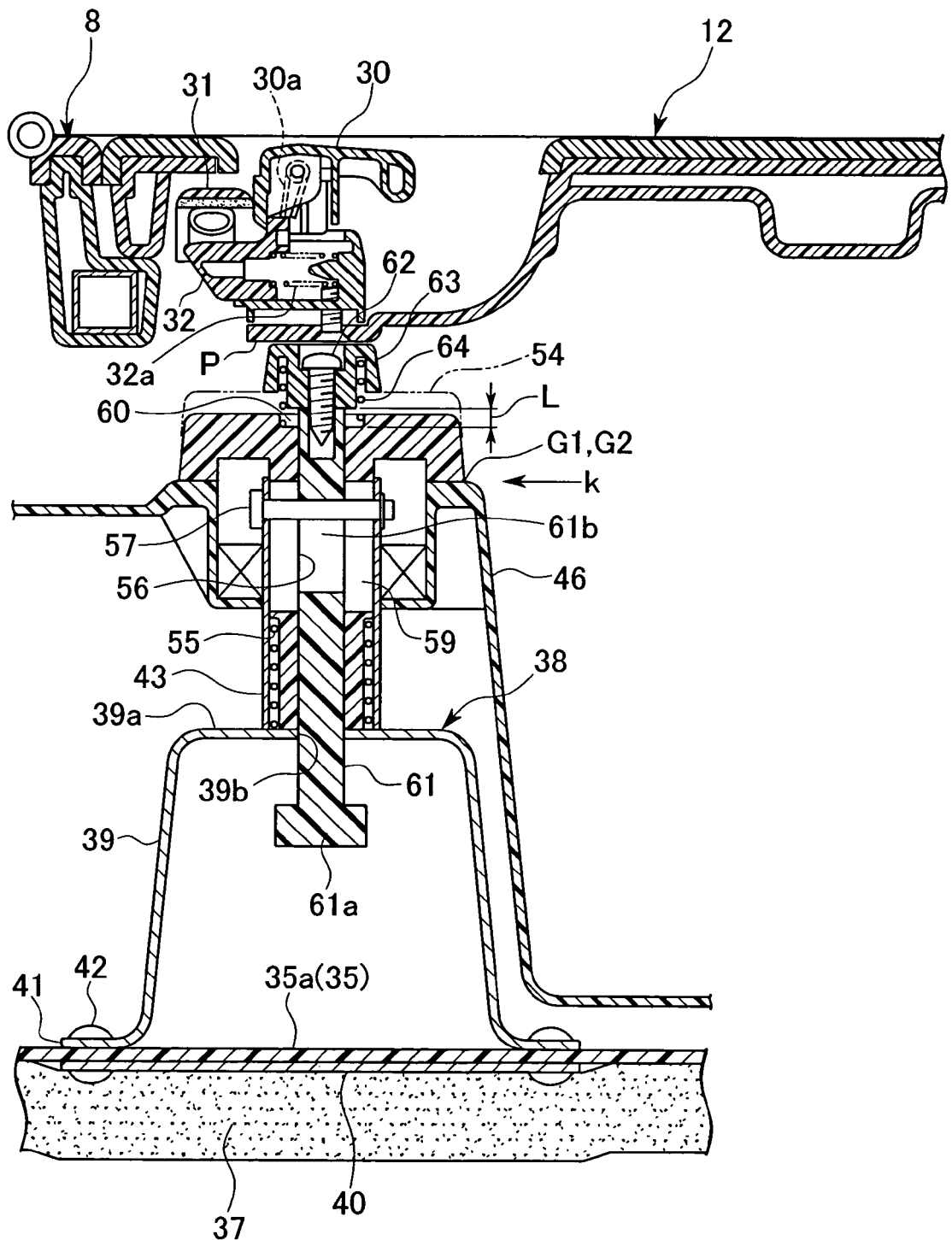
FIG. 19 is a cross-sectional view showing a handle portion of a second lid in a state in which the first lid is closed.

As shown in FIG. 19, the dimensions of the push rod 61 in the axial direction thereof are determined such that the engagement between the engagement teeth G1 of the locking element 54 and the engagement teeth G2 on the shoulder portion 45 of the rotatable tray 36 is not inhibited by the push rod 61 when both of the first and second lids 8 and 12 are closed, and whereby the push knob 63 is pressed downward.

Figure 21:
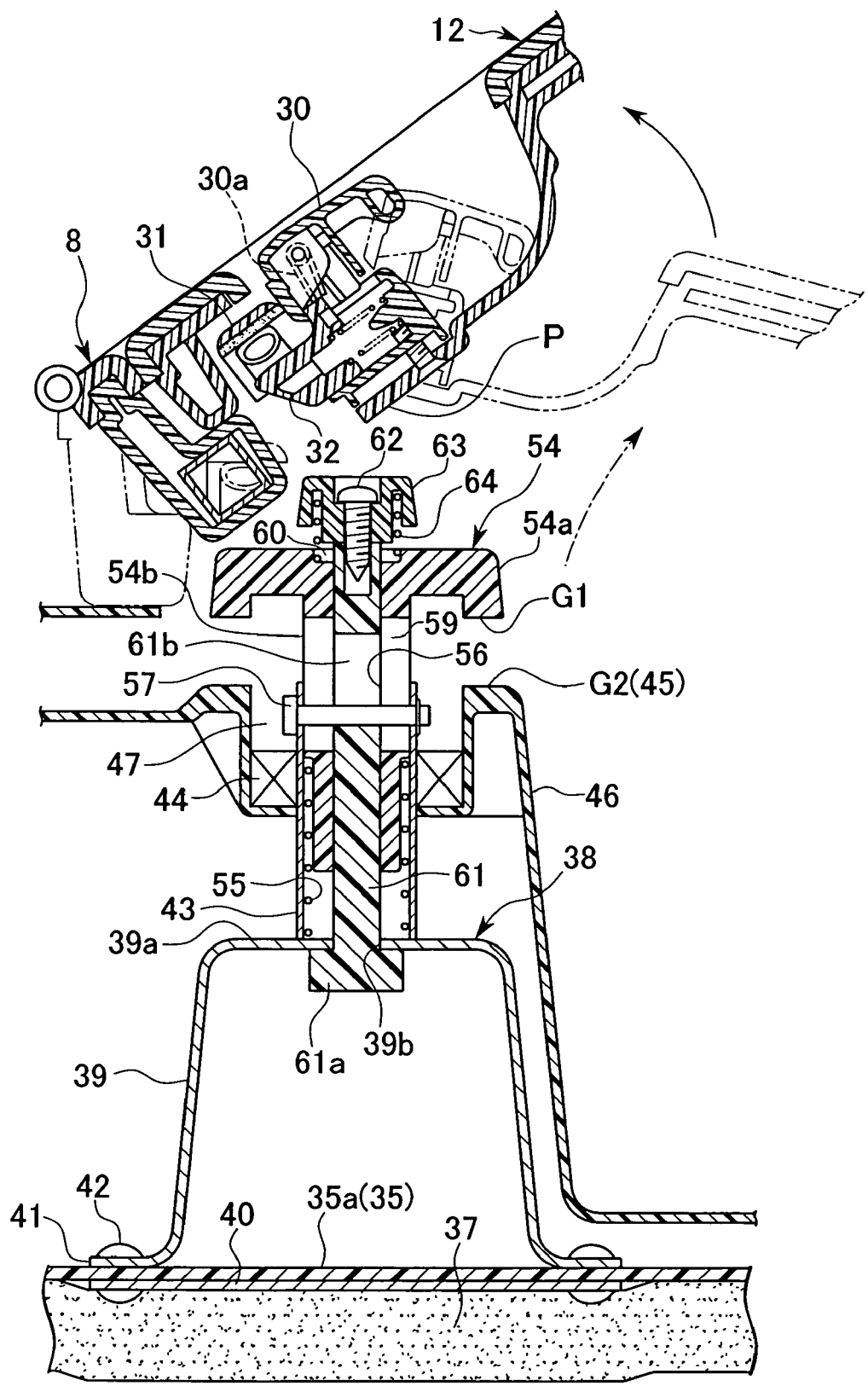
FIG. 21 is a cross-sectional view, corresponding to FIG. 19, showing the handle portion of the second lid in a state in which the first lid or the second lid is opened.

More specifically, the under side of the handle portion 30 of the second lid 12 is provided with a plane P that presses the push knob 63 downward when the second lid 12 is closed; therefore, when both of the first and second lids 8 and 12 are closed, the plane P presses the push knob 63 downward so as to place the engagement teeth G1 and the engagement teeth G2 in a locking state in which the engagement teeth G1 and G2 engage with respect to each other (see FIG. 19), while on the other hand, when either the first lid 8 or the second lid 12 is opened, because the plane P of the second lid 12 moves upward so as to cancel the pressed state of the push knob 63, the locking state between the engagement teeth G1 and G2 is cancelled (see FIG. 21). Note that the arrow in FIG. 17 indicates downward movement of the engagement teeth G1 (i.e., downward movement of the locking element 54) when both of the first and second lids 8 and 12 are in a process of being closed.

Figure 20:
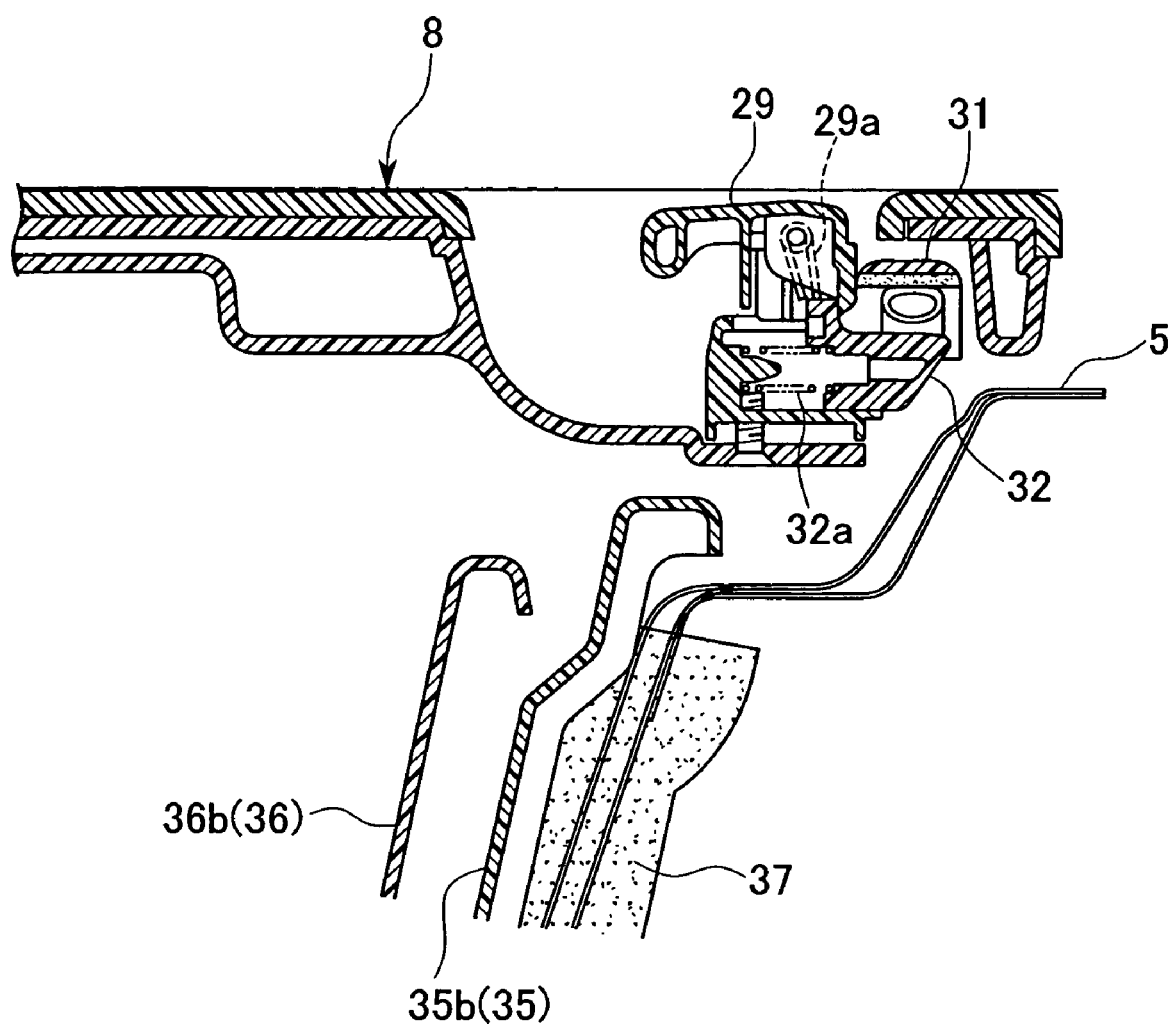
FIG. 20 is a cross-sectional view showing a handle portion of the first lid in a state in which the first lid is closed.

The spring constant of the spring 55 is determined such that the spring 55 is compressed due to the weight of the first lid 8 so as place the engagement teeth G1 and the engagement teeth G2 in a locking state (see FIG. 18) when the first lid 8 is closed as shown in FIGS. 19 and 20. The push spring 64 is provided to prevent the engagement teeth G1 and G2 from being broken even when a large rotational force is applied to the rotatable tray 36 due to such as inertia of the luggage in a state in which the first lid 8 is closed, and the engagement teeth G1 and the engagement teeth G2 are placed in a locking state. More specifically, when a large rotational force is applied to the rotatable tray 36 in the above-mentioned state, an axial movement of the locking element 54 is produced, while overcoming the restoring force of the push spring 64, by the rotation of the rotatable tray 36, i.e., the engagement teeth G1 are raised by the engagement teeth G2, and a result, the locking state between the engagement teeth G1 and G2 is temporarily cancelled. The push spring 64 also acts to allow dimensional variations in the plane P and the upper portion of the head portion 63a of the push knob 63. The spring constant of the push spring 64 is determined such that the clearance L between the locking element 54 and the push knob 63 is ensured even when the first lid 8 is closed and the push knob 63 is pressed downward so as to compress the spring 55.

According to the above embodiment, because one of the separate storage sections 49 disposed at the distal position may be moved to the proximal position by opening the first lid 8 and by rotating the rotatable tray 36, a piece of luggage stored in the rotatable tray 36 of the storage space 6, specifically in a portion thereof covered by the floor panel 5 (in a distal portion thereof), may be taken out after being moved to the proximal position. On the other hand, a piece of luggage placed in one of the separate storage sections 49 of the rotatable tray 36, which is disposed at the proximal position, may be moved to the distal position for storing by rotating the rotatable tray 36. Accordingly, a piece of luggage stored in any one of the separate storage sections 49, which may be of small size, can be easily taken out, and the piece of luggage can be stored at any position in the storage space 6.

Moreover, as shown in FIGS. 19 and 20, when the first lid 8 is placed in a closed state, the storage space 6 is closed, and the floor panel 5 is placed in a flat state. In this state, the push knob 64 is being pressed by the plane P of the second lid 12, and the spring 55 is being compressed by the locking element 54 having been moved downward by the push spring 64, whereby the engagement teeth G1 of the locking element 54 and the engagement teeth G2 on the shoulder portion 45 of the mounting portion 46 of the rotatable tray 36 are placed in an engaging state. As a result, rotation of the rotatable tray 36 is restrained, i.e., the rotatable tray 36 is substantially locked on the support base 38.

On the other hand, when the second lid 12 is closed and the first lid 8 is opened as shown by the solid lines in FIG. 21, or when the first lid 8 is closed and merely the second lid 12 is opened as shown by the two-dot chain lines in FIG. 21, the push knob 63 is freed from the plane P of the second lid 12, and the locking element 54 is moved upward by the spring 55, whereby the locking of the rotatable tray 36 on the support base 38 is cancelled. Accordingly, a piece of luggage stored in one of the separate storage sections 49 separated by the partition walls 48 can be taken out by opening the first or second lid 8 or 12, and, if necessary, by rotating the rotatable tray 36.

More specifically, when the first lid 8 is opened, approximately a half of the storage space 6 is exposed, and a piece of luggage may be taken out, if necessary, by rotating the rotatable tray 36 in an unlocked state until the piece of luggage stored in the rotatable tray 36 appears. On the other hand, when the second lid 12 is opened, a piece of luggage may be taken out, if necessary, by rotating the rotatable tray 36 in an unlocked state until the piece of luggage appears in the opening 11 formed in the first lid 8.

Accordingly, the first and second lids 8 and 12 allow passengers to access pieces of luggage stored in the storage space 6, i.e., either a passenger seated in the first row seat 2 or a passenger seated in the second row seat 3 can freely and easily access pieces of luggage stored in the storage space 6 even when access is frequently made. Moreover, because the rotatable tray 36 is provided in the storage space 6, and three separate storage sections 49 are formed in the rotatable tray 36, it is possible to place and store pieces of luggage in each of the separate storage sections 49 while opening the second lid 12 and rotating the rotatable tray 36, or it is possible to place and store pieces of luggage in one of the separate storage sections 49, which enables an easy access thereto after storing, while opening the first lid 8, and thus the entirety of the storage space 6 can be effectively utilized.

Because the rotatable tray 36 is divided into three separate storage sections 49 by the partition walls 48, and the rotatable tray 36 is configured to be locked by closing the first lid 8 or the second lid 12, when a force, which could produce rotation of the rotatable tray 36, is applied to the partition walls 48, the rotation of the rotatable tray 36 is restrained by the engagement between the engagement teeth G1 and G2 in a state in which the first lid 8 or the second lid 12 is closed. Accordingly, the positions of pieces of luggage stored in the rotatable tray 36 will not be changed due to traveling of the vehicle 1, and thus the positions of pieces of luggage can be remembered. In addition, noise due to rotation or vibration of the rotatable tray 36 can be prevented.

Moreover, because three separate storage sections 49 are ensured in the rotatable tray 36, a number of pieces of luggage may be stored in the separate storage sections 49 in an orderly manner.

Furthermore, when a rotational load greater than a predetermined value due to luggage stored in the rotatable tray 36 is applied to the rotatable tray 36 in the direction of rotation, the rotational load is transmitted from the engagement teeth G2 of the rotatable tray 36 to the engagement teeth G1 of the locking element 54 so as to raise the engagement teeth G1, the locking element 54 is raised by the amount of clearance L while the restoring force of the push spring 64 is overcome, and as a result, the locking state between the engagement teeth G2 of the rotatable tray 36 and the engagement teeth G1 of the locking element 54 is temporarily cancelled, whereby the engagement teeth G2 of the rotatable tray 36, the engagement teeth G1 of the locking element 54, and the rotatable tray 36 are prevented from being broken. Accordingly, the rotatable tray 36 is not broken even when a relatively heavy package (e.g., a bag of rice or the like) is stored in the rotatable tray 36, and a large load is applied to the rotatable tray 36 due to a braking operation of the vehicle.

On the other hand, because the first lid 8 comprises the metal frames 21 and 22, and a multi-resin-plate structure primarily including the mat 19 and the resin base 18, and the second lid 12 also comprises a multi-resin-plate structure primarily including the mat 19' and the resin base 18', the rigidities and strengths of the first and second lids 8 and 12 can be sufficiently ensured when the first and second lids 8 and 12 are closed so as to be flat with the floor panel 5.

In addition, because the flange 41 of the support base 38 (support element 39) for rotatably supporting the rotatable tray 36 is fixed such that the bottom wall 35a of the resin tray body 35 is sandwiched between the flange 41 and metal backing plate 40, the supporting rigidity of the rotatable tray 36 can be sufficiently ensured. Accordingly, the storage space 6 can be disposed under the aisles 9 without any problems.

The storage space 6 is provided under the floor panel 5 under the first row seats 2, and the separating wall 53 is provided between the floor panel 5 under the first row seats 2 and the rotatable tray 36; therefore, a piece of luggage will not be engaged between the rotatable tray 36 and the floor panel 5 so as to inhibit rotation of the rotatable tray 36, and as a result, pieces of luggage may be smoothly taken out from the rotatable tray 36 or placed in the rotatable tray 36.

The present invention is not limited to the above-explained embodiment. For example, the locking mechanism is not limited to the above configuration, and any configuration may be employed as long as the rotation of the rotatable tray 36 can be restrained. Moreover, the present invention is applicable to a vehicle in which the number of rows of seats is not three, i.e., the present invention is applicable to a vehicle having two rows of seats or four rows of seats.

INDUSTRIAL APPLICABILITY

As described above, according to the present invention, because one of the separate storage sections disposed at the distal position may be moved to the proximal position by opening the lid and by rotating the rotatable tray, a piece of luggage stored in a portion of the storage space that is covered by the floor panel (in a distal portion thereof) may be taken out after being moved to the proximal position. On the other hand, a piece of luggage placed in one of the separate storage sections that is disposed at the proximal position may be moved to the distal position for storing by rotating the rotatable tray. Accordingly, a piece of luggage stored in any one of the separate storage sections, which may be of small size, can be easily taken out, and a piece of luggage can be stored at any position in the storage space.

According to another aspect of the present invention, because a passenger seated in a first row seat can take out a piece of luggage by opening the second lid even when passengers seated in a second seat put their legs on the first lid, and a passenger seated in the second row seat can take out a piece of luggage by opening the first lid, passengers can freely and easily access pieces of luggage stored in the storage space even when access is frequently made.

According to another aspect of the present invention, because a piece of luggage stored under the front seats can be taken out by rotating the rotatable tray and by opening the first or second lid, the entirety of the storage space can be effectively utilized.

According to another aspect of the present invention, because the inside of the rotatable tray is divided into a plurality of separate storage sections by the partition walls, pieces of luggage may be stored in the separate storage sections in an orderly manner. Moreover, when a force, which could produce rotation of the rotatable tray, is applied to the partition walls, the rotation of the rotatable tray is restrained by the locking mechanism in a state in which the first lid and second lids are closed; therefore, the positions of pieces of luggage stored in the rotatable tray may not be changed due to traveling of the vehicle, and thus the positions of pieces of luggage can be remembered. In addition, noise due to rotation or vibration of the rotatable tray can be preferably prevented. Furthermore, the pieces of luggage in the storage space will not be broken due to excessive circumferential movement thereof.

According to another aspect of the present invention, because the locking state of the locking mechanism is temporarily cancelled when an excessive rotational force is applied to the partition walls due to the stored luggage, the rotatable tray and the locking mechanism are prevented from being broken. Therefore, the rotatable tray is not broken even when a relatively heavy package is stored in the rotatable tray, and a large load is applied to the rotatable tray due to a braking operation of the vehicle. Moreover, variation in relative positioning between the lids and the rotatable tray may be reduced.

According to another aspect of the present invention, because the rigidities and strengths of the first and second lids can be sufficiently ensured when the first and second lids are closed so as to be flat with the floor panel, the first and second lids may be disposed in the aisles that may support the weight of the passengers.

According to another aspect of the present invention, because the supporting rigidity of the rotatable tray can be sufficiently ensured, the storage space may be disposed under the aisles that may support the weight of the passengers.

According to another aspect of the present invention, because a piece of luggage will not be engaged between the rotatable tray and the floor panel so as to inhibit rotation of the rotatable tray, pieces of luggage may be smoothly taken out from the rotatable tray or placed in the rotatable tray.

The invention claimed is:

1. An underfloor storage structure for a vehicle comprising:
    a floor panel which includes a concave portion as a storage space, and which partially covers a port of the storage space;
    a rotatable tray disposed in the storage space; and
    at least one lid for selectively closing the remaining portion of the port of the storage space;
    wherein the vehicle comprises first row seats having two separate seats and second row seats located behind the first row seats,
    wherein the storage space extends from a position under the first row seats to a position in front of the second row seats, and
    wherein the underfoot storage structure comprises a first lid whose rear edge is made liftable for selectively closing the port of the storage space, and a second lid which is provided in the first lid, and whose front edge is made liftable.

2. An underfloor storage structure for a vehicle according to claim 1, wherein the second lid is located between the separate first row seats.

3. An underfloor storage structure for a vehicle according to claim 1, wherein a locking mechanism is provided to the rotatable tray, which locks the rotation of the rotatable tray upon closing the lid.

4. An underfloor storage structure for a vehicle according to claim 3, wherein the locking mechanism is configured such that the locking of the rotatable tray is cancelled when a rotational load greater than a predetermined value due to luggage stored in the rotatable tray is applied to the rotatable tray.

5. An underfloor storage structure for a vehicle according to claim 1, wherein at least one of the first and second lids comprises a metal frame and a resin plate.

6. An underfloor storage structure for a vehicle comprising,
    a floor panel which includes a concave portion as a storage space, and which partially covers a port of the storage space, said storage space having a bottom;
    a rotatable tray disposed in the storage space; and
    at least one lid for selectively closing the remaining portion of the port of the storage space;
    wherein, on the bottom of the storage space, there is provided a support base for rotatably supporting the rotatable tray, and
    wherein the support base comprises a support element made of metal, a backing plate made of metal, and a resin tray body sandwiched between the support element and the backing plate.

7. An underfloor storage structure for a vehicle according to claim 1, wherein a separating wall is provided between the floor panel under the first row seats and the rotatable tray.

* * * * *